United States Patent [19]

Regipa

[11] 4,420,130
[45] Dec. 13, 1983

[54] FABRICATION PROCESS FOR AN ENVELOPE, IN PARTICULAR FOR SPACE BALLOONS, ENVELOPE THUS MADE, AND ITS APPLICATION TO THE AEROSPACE DOMAIN

[75] Inventor: Robert Regipa, Toulouse, France
[73] Assignee: Centre National d'Etudes Spatiales, Paris, France
[21] Appl. No.: 218,749
[22] Filed: Dec. 22, 1980

[30] Foreign Application Priority Data

Jan. 4, 1980 [FR] France ............... 80 00343

[51] Int. Cl.³ ............................................. B64B 1/40
[52] U.S. Cl. ..................................... 244/31; 244/126
[58] Field of Search ...................... 244/29–33, 244/96–98, 128, 126; 89/36 R; 102/9, 37.1, 34.3; 343/706

[56] References Cited

U.S. PATENT DOCUMENTS 2,858,090 10/1958 Winzen et al. ..................... 244/31
2,864,569 12/1958 Froehlich ........................... 244/33
3,182,932 5/1965 Winker ............................... 244/31

FOREIGN PATENT DOCUMENTS 389278 9/1908 France ............................... 244/32
2418150 10/1979 France ............................... 244/31
130657 8/1919 United Kingdom ................ 244/97

Primary Examiner—Trygve M. Blix
Assistant Examiner—Jesús D. Sotelo
Attorney, Agent, or Firm—Shlesinger, Arkwright, Garvey & Dinsmore

[57] ABSTRACT

A stress control mechanism for a space balloon is comprised of an axial tie member extending from the upper pole of a load carrying space balloon envelope, the tie member passing from the upper pole of the space balloon envelope through the balloon to an aperture located in a slideable member attached to the lower pole of the space balloon, a stopping member positioned at a pre-selected point on the axial tie member as a member for stopping the slideable member and thereby permitting the space balloon to assume a pre-selected shape upon inflation of the space balloon.

19 Claims, 17 Drawing Figures

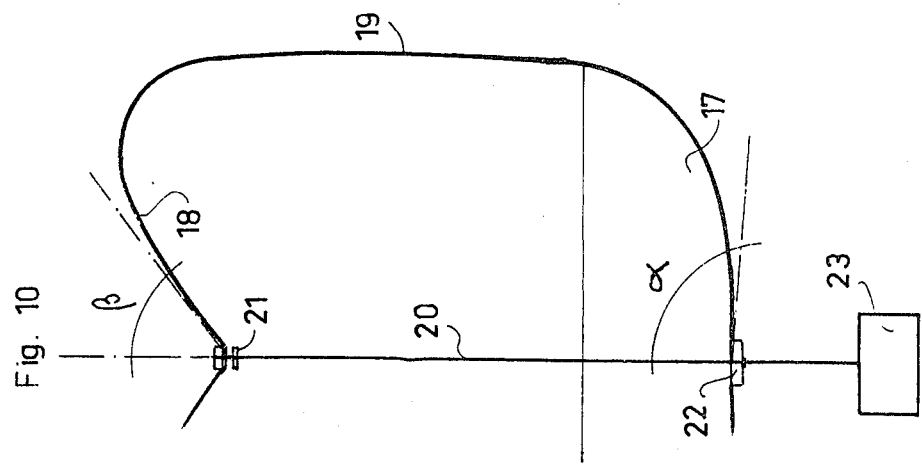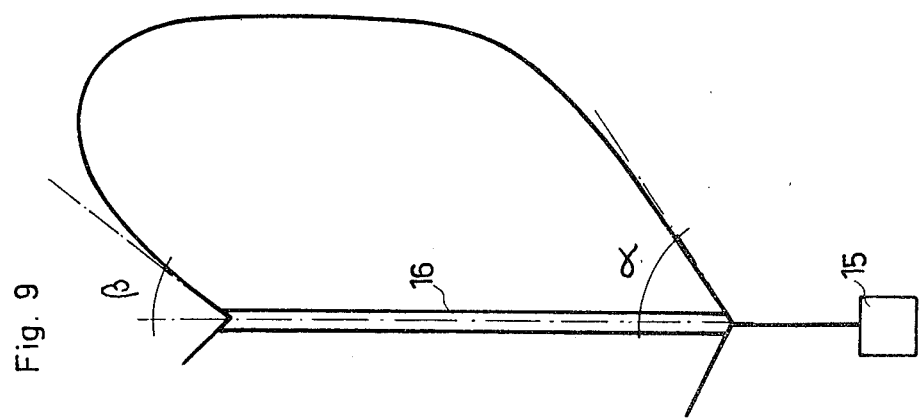

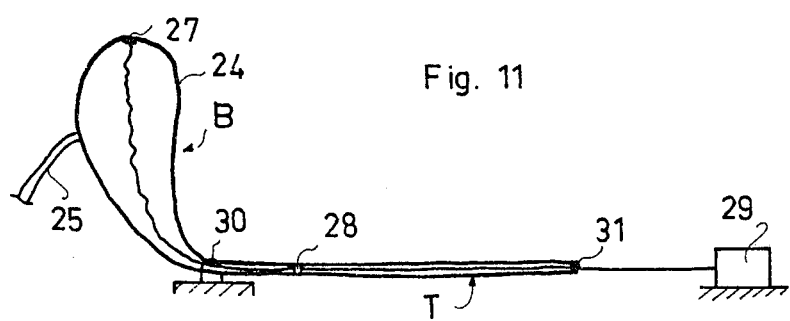
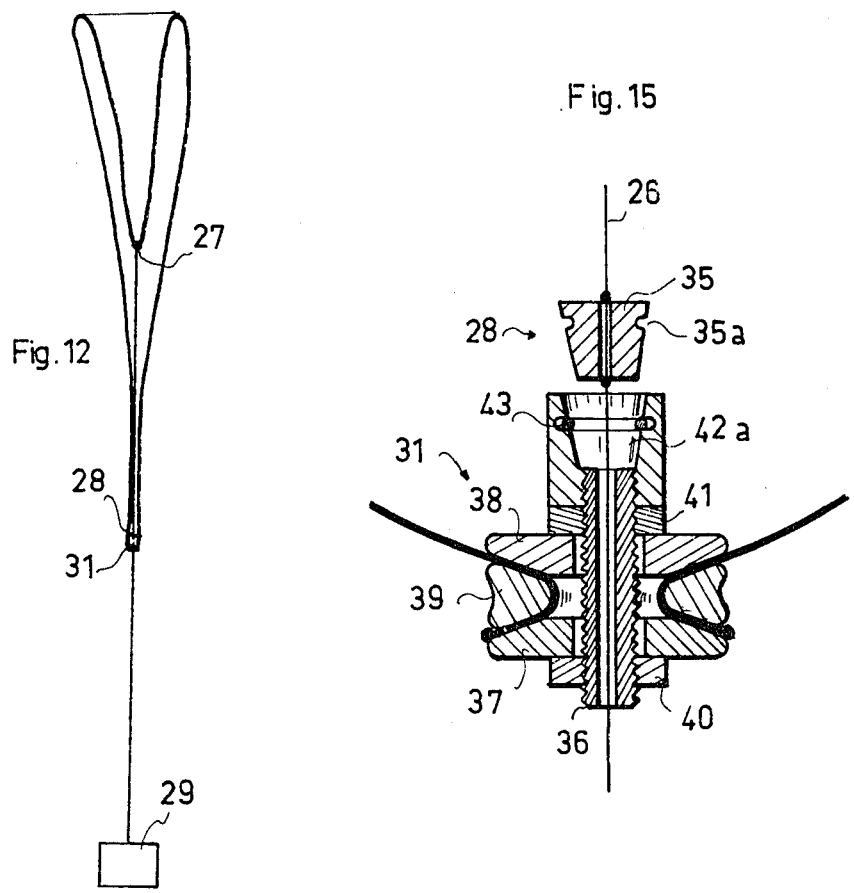

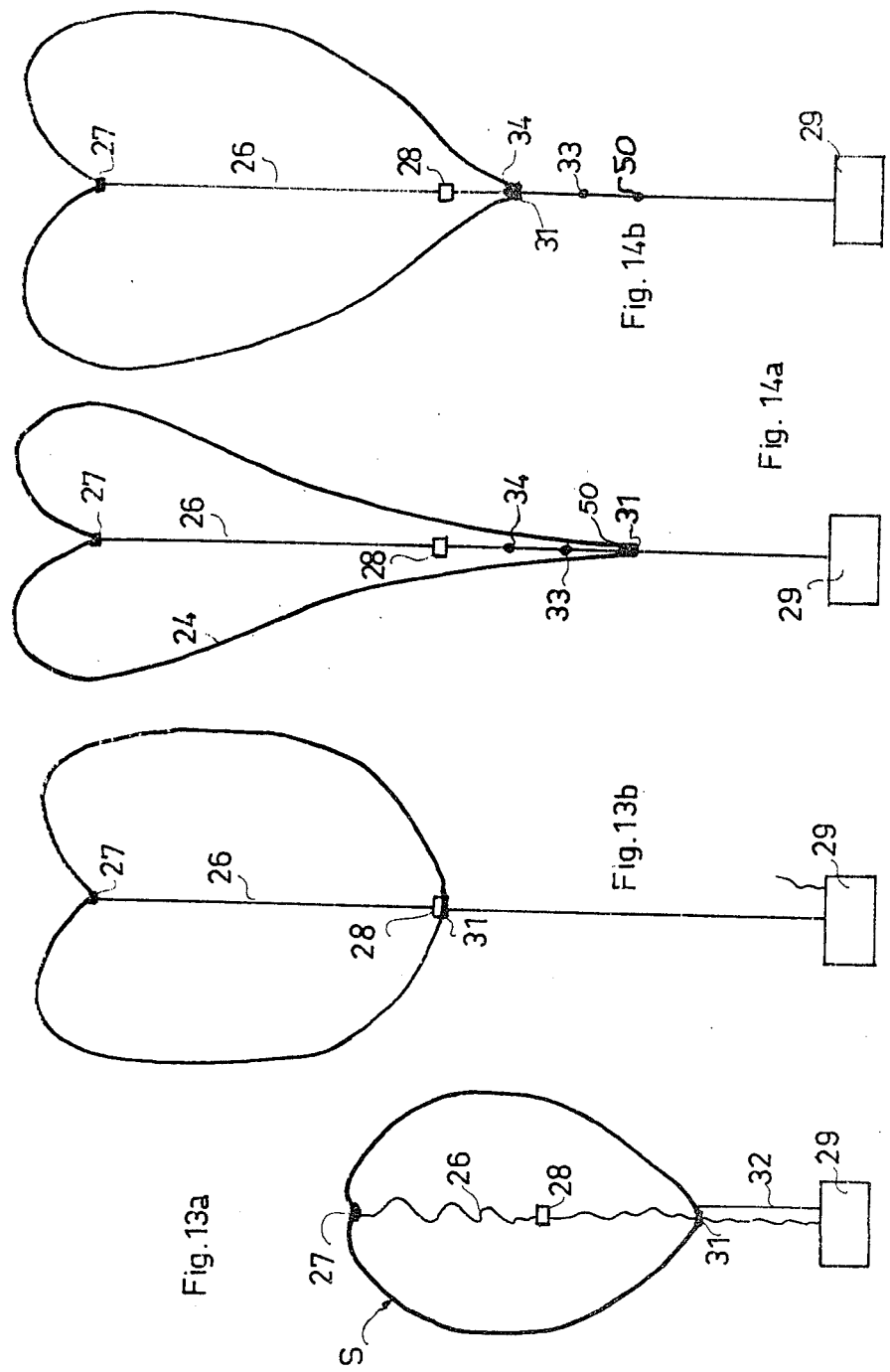

FABRICATION PROCESS FOR AN ENVELOPE, IN PARTICULAR FOR SPACE BALLOONS, ENVELOPE THUS MADE, AND ITS APPLICATION TO THE AEROSPACE DOMAIN

The invention relates to a process for fabricating an envelope using a flexible material, in particular applying to making a space balloon; it extends as a novel industrial product to the envelopes thus made and with respect to the application of this product to the aerospace domain to a method for launching a space balloon.

As a rule the stratospheric-balloon envelopes assume an overall water-drop shape of which the exact contour depends on the contemplated mission. Generally these envelopes are manufactured by assembling a plurality of longitudinal gores that were cut in precise manner and comprise suitable curvatures to obtain the desired shape after inflation. These gore lengths may be large, and the cutting operations along precisely defined curved lines, followed by the assembly along the curved edge so obtained, require lengthy and delicate implementation, and significantly burden balloon costs.

Furthermore, as regards this type of balloon, the material is locally subjected to excess stresses, of relatively high magnitudes compared to the average stress exerted on the material, whereby it is necessary to make use of excess-dimensions films with regard to mechanical strength so as to make them resistant to those local excess stresses. Thus mechanically is poorly utilized; the cost of the balloon and its weight as a consequence are substantially increased.

Furthermore the shapes that can be obtained from the overall water-drop form are fairly restricted and poorly fitted to some types of missions.

It is the object of the present invention to propose a novel envelope fabrication process allowing to alleviate the above-cited drawbacks.

One object of the invention in particular is to simplify substantially the various fabrication operations so as to reduce the cost of the envelopes obtained.

Another object is to ensure improved utilization by substantially reducing the maximum local stresses applied to the material so as to eliminate costly oversizing of this material.

Another object is to provide new balloon shapes better meeting certain mission types; in particular it is the object of the invention to supply a balloon shape especially fitted to operate as an infrared hot-air balloon.

Another object is to offer shapes such that the stresses exerted on the inflated or filled balloon are approximately distributed in homogeneous manner.

Again it is the object of the invention with respect to aerospace applications to facilitate launching balloons obtained by the above cited process.

One objective in particular is to provide a novel launching method for these balloons.

The process of the invention for fabricating an envelope, in particular for space ballons, consists in making an essentially cylindrical sheath from a flexible, hermetic material capable of withstanding slight tangential tensions in all directions of its plane and extended by lower and upper end portions, in joining the edge points of the lower end portion together at the axis of the sheath in the area of a zone called lower envelope pole, in joining the edge points of the upper end portion in the area of a zone called the upper envelope pole, in joining the upper and lower poles by a non-stretching or little-stretching tie-means of length L, and in adjusting the length L of the said tie-means as a function of the desired envelope shape.

By using a cylindrical sheath at the level of the envelope equator at an appreciable envelope height, a substantial simplification of the envelope fabrication operations is obtained, and the presence of the axial tie-means by an easy control operation of the distance between the poles allows obtaining diverses shapes depending on the contemplated application; part of the envelope tensions (which depend on its shape) is supported by the axial tie-means, so that the tensions exerted on the flexible material of the envelope are decreased, in some cases in substantial proportions. Moreover, it was observed that the local excess tensions exerted on the envelope material are proportionately much reduced compared to those exerted on conventional envelopes, in particular on the water-drop shaped balloon envelopes.

In the application under consideration, the cylindrical sheath may be fabricated in various ways. It may be made by assembling a plurality of longitudinal gores which in the area of said sheath evince an essentially rectangular shape, whereby cutting and assembly are easy and low-cost; in other applications, it may be made directly in the form of a tubular sleeve from an extruder or another fabricating means.

In a first implementing mode of the process of the invention, the end portions extending the cylindrical sheath themselves are approximately cylindrical with a radius equal to that of the sheath; the edges of the end portions then are joined to the lower and upper poles by forming pleats along said portions. This implementing mode results in an extremely economical manufacture because the envelope is wholly cylindrical when being cut; this implementing mode is preferred for those applications or missions compatible with the presence of pleats on the upper and lower portions of the envelope. Also, this implementing mode offers the advantage to substantially increase the homogeneity of the unit-area tensions applied to the envelope material.

As regards other applications or missions requiring an envelope with few pleats, the envelope is made by assembling longitudinal gores of essentially rectangular shape at the level of the cylindrical sheath and tapering at the level of its end portions; these gores, which are rectangular over a large part of their length, are easier to cut and to join than is the case for conventional envelopes, the cutting and joining work relating to a variable gore width being restricted to the envelope's end portions; also, the presence of a tie-means absorbing part of the tensions and in a large measure determining the final shape of the filled or inflated envelope does lessen the critical feature of the gore shapes, said gores permitting cutting and joining to be carried out at much less rigorous tolerances.

The above-cited longitudinal gores can be advantageously joined edge on edge by means of longitudinal reinforcing tapes capable of supporting part of the longitudinal stresses exerted on the envelope and in particular on its upper and lower parts; such a joining operation may be carried out in particular in conformity with the method described in the French parent No. 71.12662 published under No. 2,133,453.

The invention extends to the symmetry-of-revolution envelopes made by the process of the invention; its object especially is in particular envelope shapes which will be described in detail further below: Flat-bottom envelopes making possible in particular the manufacture of infrared hot-air ballons enjoining excellent efficiency, and envelopes assuming a generally cylindrical-cardioid shape ensuring good tensional homogeneity.

Lastly, regarding the application of the above cited envelopes in aerospace, it is the object of the invention to provide a launching method for a space balloon fabricated by the above cited process; this launching method consists in freeing the lower pole from the tie-means in such a manner that this pole may slide along said tie-means, in ensuring the expansion of the envelope so as to make the lower pole slide toward the upper pole, and in ensuring the locking of the lower pole on the tie-means when said lower pole arrives at a position for which the tie-means length between the upper and lower poles equals the appropriate length L. P As will be more thoroughly understood further below, this method allows obtaining the desired shape and facilitates the practical launching operations.

Other characteristics, purposes and advantages of the invention will become clear in relation to the description below and the attached drawings which show illustrative embodiments of the invention.

FIG. 9 is a partial schematic illustrating a cylindrical-carioid shaped balloon made in conformity with the process of the invention;

FIG. 10 is a partial schematic showing a flat- bottomed infra-red hot-air balloon obtained by the process of the invention;

FIGS. 11, 12, 13a, 13b 14a and 14b schematically represent balloon launching modes of the invention and FIG. 15 is a detailed section of click means used during launch.

Figure 1:
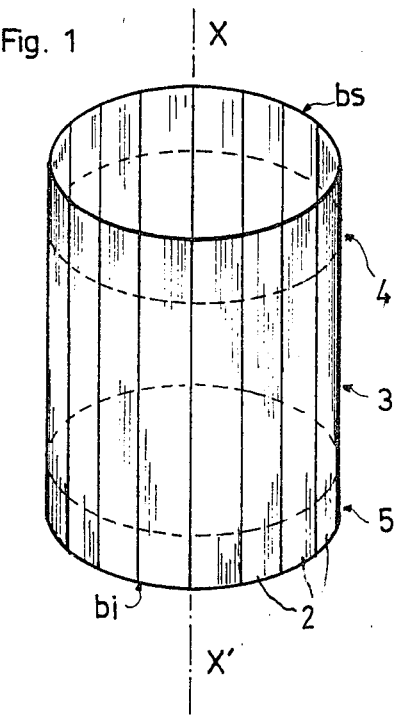
FIGS. 1, 2 and 3 illustrate an implementing mode of the invention's process.

The envelope 1 shown schematically in FIG. 1 is fabricated by joining rectangular gores such as 2 consisting in particular of a polyethylene film capable of withstanding tangential tensions in all the directions of the film plane (circumferential and tangential). Such an assembly is carried out by any known means along the rectilinear edges of the gores and results in a cylindrical sheath 3 extending at the top and bottom by end portions 4 and 5 themselves cylindrical.

It is clear that such a cylindrical assembly represents an easy and low-cost manufacture.

Figure 2:
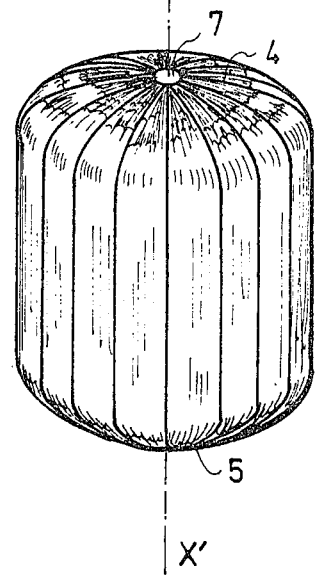
Figure 4:
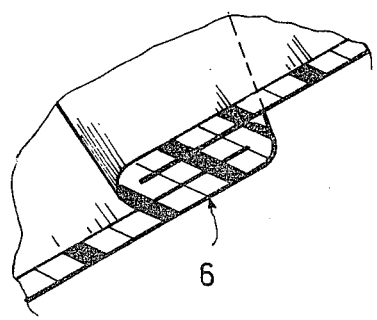
FIG. 4 is a detailed section of the envelope along a plane A perpendicular to said envelope.
Figure 5:
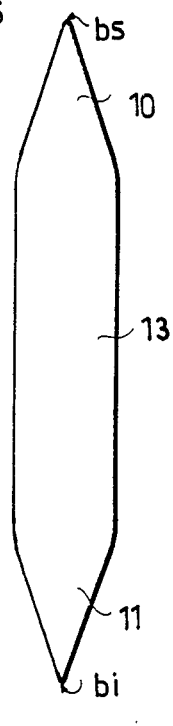
FIGS. 5, 6 and 7 illustrate another implementing mode
Figure 6:
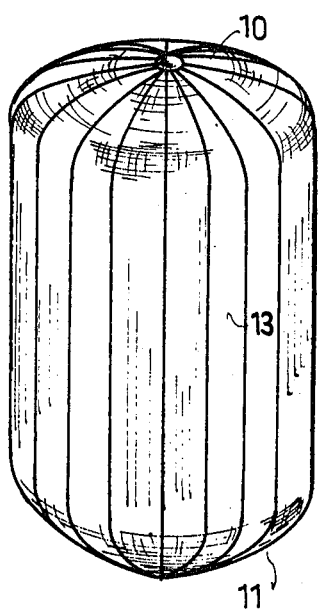
Figure 7:
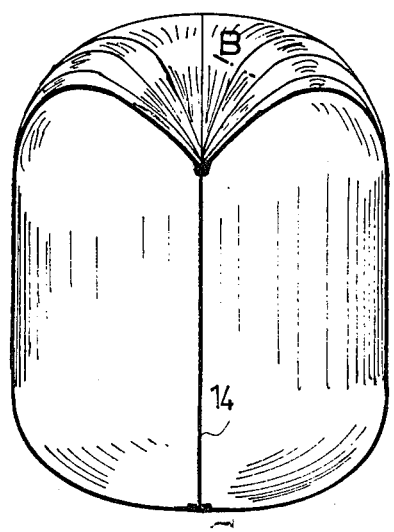

The edge points $b_s$ and $b_i$ of the portions 4 and 5 thereafter are joined together on the axis XX' of the sheath due to the formation of pleats 6 in these portions, as shown by FIG. 4. The edge points $b_s$ and $b_i$ are fixed in the vicinity of the axis XX' on disk-shaped pieces 7 and 8 (FIG. 2) which, depending on the application, may consist of a flexible or rigid material (these pieces define the lower and upper poles of the envelope).

The pleats of portions 4 and 5 may be left loose; it is however also possible to fix them one onto the other, locally or continuously, the various film thickness forming each pleat.

Moreover, prior to closing the envelope, a non-stretching tie-means 9, which may be a cable, a sleeve, a strong band etc. is emplaced between the pieces 7 and 8.

Figure 3:
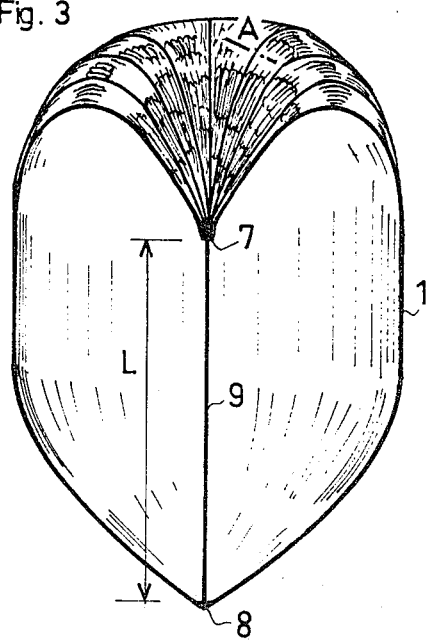

The length L of the tie-means 9 is adjusted in every application as a function of the various envelope parameters and of the contemplated mission (material properties, weights of the various elements and of load, filling-gas characteristics, atmospheric conditions in which the balloon shall be subjected) in order to obtain the desired shape. FIG. 3 shows a cylindrical-cardioid envelope substantially lowering the local excess stresses applied to the material.

The FIGS. 5, 6, 7 and 8 illustrate another implementing mode of the process using gores 13 which are rectangular across part of their height and extending by tapering end portions 10 and 11.

In this case, the size of the pleats obtained when the edge points $b_s$ and $b_i$ of portions 10 and 11 are joined on the axis is much reduced.

Figure 8:
FIG. 8 is a detailed section along a plane B of the envelope obtained.

The gores may be assembled as schematically indicated in FIG. 8 by means of two reinforcing tapes such as 12 which are heat-fused on either side of the gores arranged edge against edge. These tapes are made to be of such mechanical strength that they can withstand part of the longitudinal stresses exerted on the envelope. Conventionally for instance they may consist of a layer of polyester placed between two layers of polyethylene.

The edges $b_s$ and $b_i$ are fastened at the level of the upper pole and at the level of the lower pole on disk-shaped pieces in the same manner as precedingly and a non-stretching tie-means 14 is placed between these poles to link them. In the schematic example shown in FIG. 7, the length of this tie-means was adjusted as a function of the various parameters to obtain a flat-bottomed envelope.

It is clearly understood that the above cited implementing examples are solely meant to be illustrative of the invention which covers all possible variations.

FIG. 9 shows in schematic form a space balloon of cylindrical-cardioid shape filled with helium and to which is suspended a load 15. The tie-means between the upper and lower poles consists of a flexible and mechanically strong sleeve 16 of which the length L was so adjusted to maximally homogenize the distribution of the tensions applied to this material.

It was found by experiment and computation that this result will be obtained by so adjusting the length L that in each radial plane the angle $\alpha$ subtended between the axis and the tangent to the lower envelope pole, and the angle $\beta$ subtended between the axis and the tangent to the upper pole be approximately between 30° and 60°. The precise selection of these angles within this range depends on varous balloon parameters and mission features.

FIG. 10 illustrates an infra-red hot-air type balloon in which the length L of the tie-means 20 between the upper and lower poles was adjusted to obtain a flat bottom. To that end this length is controlled in such a manner that in each radial plane the angle $\alpha$ (subtended between the axis and the tangent to the envelope at the lower pole) be approximately between 92° and 100° and that the angle $\beta$ (subtended between the axis and the tangent to the envelope at the upper pole) be approximately between 30° and 60°.

In this application, the flat bottom 17 of the envelope as far as the boundary of the cylindrical portion is made of a transparent or only slightly absorbing material as regards infrared radiation, while the upper part 18 and the cylindrical part 19 are made to be essentially opaque to infrared radiation and to absorb it. The Pat. No. 2,418,150 is referred to for further details on the manner of obtaining a material with these optic properties. A valve 21 is provided in conventional manner at the upper pole to seal or open an escape aperture, and a permanent opening 22 is fashioned in the lower pole to allow filling the balloon naturally.

The tie-means 20 between the lower and upper poles may consist of a cable suspended at the top and at the bottom from a hoop to which it is joined by radial tubes. At the bottom, this cable extends to hold the load 23; at the top, the cable 20 may be used to keep in place the valve and its control means.

The flat-bottom shape provides excellent receiving efficiency of the infrared radiation from earth (or, more generally, from the planet being explored). The collected radiation is absorbed by the cylindrical portion 19 and the upper portion 18 of the hot-air balloon, and ensures heating the gas contained in the envelope, whereby the autonomous aerostat is obtained, which can be steared by controlling the upper valve.

Elsewhere, the FIG. 11 illustrates the first phase in the launch of a balloon of the invention; three different implementing modes of the second launch phase are illustrated in the FIGS. 12, 13a, 13b, 14a, and 14b.

These figures show the same reference numerals for the same element, to wit 24 is the envelope being inflated, 25 is an inflation duct, 26 is the axial tie-means of the envelope, 27 and 28 are the final positions of the upper and lower poles of the envelope corresponding to the filled-balloon state, and 29 is the load suspended from the lower end of the tie-means 26.

The first launching phase (FIG. 11) consists in creating a bubble B in the upper envelope part by suitable inflation; this upper part is conventionally bounded during this phase by a constriction 30 kept on the ground. The FIG. 11 shows the train T of the balloon, resting on the ground upstream of said constriction.

The upstream end of the train T is provided with a member 31 capable of sliding along tie-means 26 and of clicking with a conjugate member, fastened at 28 on the tie-means at the distance L from the upper pole 27.

In a first implementation mode shown in FIG. 12, the second launching phase consists thereupon in removing the envelope from the constriction 30 and to ensure locking by clicking the member 31 with member 28 so as to maintain a distance L between the lower and upper poles; to that end, the member 31 is made to slide along the tie-means thanks to the balloon expansion caused either by inflation from a fixed point on the ground or at the onset of ascent in the case of a launch using auxiliary balloons.

In a second implementing mode illustrated in the FIGS. 13a and 13b, the second launch phase may be carried out by locking the member 31 located at the low part of the envelope at a distance much exceeding L from the upper pole 27; in this mode of implementation, this organ 31 is locked on the tie-means approximately in the position shown in FIG. 11, namely at the end of the train T.

This temporary locking can be carried out in particular using an auxiliary tie-means 32 connecting member 31 and load 29.

When the bubble B achieved during the first phase has become sufficiently large, the balloon rises with a temporarily elongated shape; its expansion grows during the ascent (FIG. 13a), with little risk that the low part of the envelope become entangled, as the train T has wholly vanished.

The auxiliary tie-means 32 thereupon is severed while in flight, enabling thereby the member 31 to slide along the axial tie-means 26 and click with the organ 28 (FIG. 13b i at the distance L from the upper pole 27.

This launching mode offers the advantage of eliminating the risk of entanglement of the low part of the envelope; however, during the interim period in which the balloon as yet is not entirely filled, excess circumferential tensions may be exerted on the upper part S of the envelope that is very roughly conical.

To lower these excess tensions, it will be preferably in some applications to use a third implementing mode which is illustrated in FIGS. 14a and 14b.

In this implementing mode, the lower member 31 of the envelope temporarily locked on the tie-means 26 in a position which is intermediary between those shown in FIG. 12 and that of FIG. 13a.

This locking can be implemented as above by means of an auxiliary tie-means (longer than the preceding one) or by means of an interim stop 50 against which the member 31 comes to rest.

During ascent, this member 31 will be freed and can then slide along the tie-means as the balloon expands. Other stop pieces such as 33 and 34 if appropriate can be provided along the tie-means 26 to progressively obtain the fully filled balloon shape (FIG. 14b).

Be it noted that this shape also can be obtained in progressive manner by providing a preset or remote-controlled deceleration system at the low part of the envelope.

In this manner, the distance between the two poles can be fitted during ascent to reduce the excess tensions exerted on the envelope, so that the filled state will correspond to a final distance L between the poles 27 and 28.

The FIG. 15 is a detailed section showing illustratively the clicking member 31 which is located at the low part of the envelope; this member is fitted to slide along the tie-means 26 and to click with a conjugate member which is fixed on this tie-means in a position 28 that must be assumed by the lower pole when the balloon is filled.

This conjugate member consists of a frustrum-of-cone piece 35 which is axially traversed by an aperture through which passes the tie-means 26; knots made in the tie-means upstream and downstream of this piece or any other fastening means permit securing said piece to the tie-means.

This piece 35 includes on its outer frustrum-of-cone surface an annular groove 35a for the purpose of click action.

The member 31 located at the envelope base includes a threaded rod 36 drilled clear along its axis to allow passing the tie-means 26.

Two clamping disks 37 and 38 are arranged around said rod and conventionally provided with conical flanks co-operating with a torodial piece 39 to tighten the lower envelope rim. Two nuts 40 and 41 perform the tigtening action.

Furthermore, a piece 42 provided with a conical-flank seat 42a and of a shape conjugate with that of piece 35 is fixed to the end of the rod 36 located near the balloon inside. This piece 42 contains a spring-rod 43 which is seated in an annular groove to project into the seat 42a.

The spring-rod 43 is fitted to retreat into its groove when the piece 35 is passing through and it is located in such a manner it can click into the groove 35a of said piece 35 at the end of the insertion of same into the seat 42a.

The above example described in relation to FIG. 15 intends merely to illustrate one possible type of click means and it is self-evident that other modes if implementation can be suggested by the expert.

In general terms, the invention is not restricted to the terms of the description but includes all variations.

I claim:

1. A stress controlled mechanism for a space balloon having a longitudinal axis, comprising:
   a. an axial tie means extending from the upper pole of a space balloon envelope, wherein said tie means passes through said space balloon envelope interior and through an aperture located in a slideable member fixedly attached to the lower pole of said space balloon envelope; and,
   b. an adjustable stopping member positionable at a pre-selected point along said axial tie means in said space balloon interior as a means for stopping said slideable member and permitting said space balloon to assume a pre-selected shape upon inflation of said balloon.

2. A stress control mechanism for a space balloon having a longitudinal axis as defined in claim 1, wherein:
   a. said stopping member comprises a frustrum-of-cone piece axially traversed by an aperture through which passes said axial tie means, and further comprising a circumferential annular groove on said frustrum-of-cone outer surface.

3. A stress control mechanism for a space balloon having a longitudinal axis as defined in claim 1, further comprising:
   a. an aperture extending axially through said slideable member surrounding said axial tie means;
   b. envelope clamping means in said aperture; and,
   c. said clamping means includes a central opening for receiving and positively holding said stopping member.

4. A stress control mechanism for a space balloon having a longitudinal axis as defined in claim 3, wherein:
   a. said clamping means includes two clamping disks surrounding said aperture, wherein further said clamping disks control conical flanges;
   b. a toroidal piece; and,
   c. a toroidal clamping means for co-operating with said toroidal piece and said clamping disks conical flanges for attaching said space balloon envelope to said slideable member.

5. A stress controlled mechanism for a space balloon having a longitudinal axis as defined in claim 3, wherein:
   a. one end of said aperture contains a conical flange seat wherein said seat has a slope adapted to receive said stopping member;
   b. an annular groove is circumferentially located about said conical flange seat; and,
   c. said annular groove contains a spring rod seated therein for projecting into said conical flange seat, wherein further said stopping member annular groove accepts said spring rod.

6. A stress control mechanism for a space balloon having a longitudinal axis as defined in claim 1, wherein:
   a. said stopping member is set at a point on said axial tie means that the angle $\alpha$ subtended between the axis and the tangent to the envelope at the lower pole is approximately 92° to 100° and that the angle $\beta$ subtended between the axis and the tangent to the envelope at the upper pole is approximately 30° to 60°, wherein said balloon resembles a flat bottomed envelope with minimum longitudinal stress.

7. A stress control mechanism for a space balloon having a longitudinal axis as defined in claim 1, wherein:
   a. said stopping member is set at a point along said axial tie means such that the angle $\alpha$ subtended between the axis and the tangent to the envelope at the lower pole as well as the angle $\beta$ subtended between the axis and the tangent to the envelope at the upper pole is approximately 30° to 60°, wherein said balloon assumes a cylindrical-cardioid shape in which longitudinal stress is minimized.

8. A stress control mechanism for a space balloon having a longitudinal axis as defined in claim 1, wherein:
   a. said axial tie means extends through said aperture to a load suspended below said balloon envelope.

9. A stress control mechanism for a space balloon having a longitudinal axis as defined in claim 1, wherein:
   a. said stopping member is located inside said space balloon envelope interior.

10. A method of inflating a space balloon having a longitudinal axis, comprising the steps of:
    a. extending an axial tie means from the upper pole of a deflated space balloon envelope through said balloon interior and through an aperture located in a slideable member fixedly attached at said balloon lower pole and then to a load;
    b. fastening a stopping member at a pre-selected point along said axial tie means;
    c. inflating said space balloon and allowing said space balloon to ascend; and,
    d. sliding said slideable member along said axial tie means, wherein said stopping member prevents said sliding member from sliding any further as a means for allowing said space balloon to assume a pre-selected shape with minimum longitudinal stress.

11. A method of inflating a space balloon having a longitudinal axis as defined in claim 10, further comprising the steps of:
    a. fastening an auxiliary tie means to said load and said slideable member as a means for preventing said slideable member from sliding; and,
    b. severing said auxiliary tie means at a preselected point as a means for allowing said slideable member to slide.

12. A method of inflating a space balloon having a longitudinal axis as defined in claim 10, further comprising the steps of:
    a. fastening a number of spaced apart stopping members on said axial tie means;
    b. releaseably attaching said sliding member to a first of said stopping members; and,
    c. releasing said sliding member at a pre-selected point from said first stopping member and allowing said sliding member to slide from one stopping member to another as said sliding member is released from said stopping members at preselected points.

13. A method of inflating a space balloon having a longitudinal axis as defined in claim 12, further comprising the steps of:
    a. releasing said slideable member when said space balloon longitudinal stress exceeds a pre-selected value as a means for maximizing said space balloon circumferential stress and minimizing longitudinal stress.

14. A method of inflating a space balloon having a longitudinal axis as defined in claim 10, further comprising the steps of:
   a. fastening said balloon to a launch site by fastening means attached to said space balloon envelope and to said launch site;
   b. partially inflating said space balloon; and,
   c. severing said fastening means and allowing said space balloon to ascend.

15. A method of inflating a space balloon having a longitudinal axis as defined in claim 10, further comprising the steps of:
   a. positioning said stopping member such that the angle $\alpha$ subtended between the axis and the tangent to the envelope at the lower pole is approximately 92° to 100° and that the angle $\beta$ subtended between the axis and the tangent to the envelope at the upper pole is approximately 30° to 60°, and wherein said balloon resembles a flat bottomed envelope having minimal longitudinal stress.

16. A method of inflating a space balloon having a longitudinal axis as defined in claim 10, further comprising the steps of:
   a. positioning said stopping member such that the angle $\alpha$ subtended between the axis and the tangent to the envelope at the lower pole and the angle $\beta$ subtended between the axis and the tangent to the envelope at the upper pole is approximately 30° to 60°, and wherein said balloon assumes a cylindrical-cardioid shape with minimal longitudinal stress.

17. A method of inflating a cylindrical space balloon envelope having a vertical axis and having upper and lower poles and containing a vertical axial tie means between said poles, comprising the steps of:
   a. providing a cylindrical space balloon envelope;
   b. inflating said space balloon until the angle $\beta$ subtended between the vertical axis and the tangent to the envelope at the upper pole is approximately 30° to 60°; and,
   c. ceasing inflation,
   d. preventing further expansion of said envelope by means of a stopping member selectively positioned on said axial tie means to engage a slideable member fixedly attached to said lower pole.

18. A method of inflating a cylindrical space balloon envelope having a vertical axis and having upper and lower poles and containing a vertical axial tie means between said poles as defined in claim 17, further comprising the steps of:
   a. ceasing inflation when the angle $\alpha$ subtended between said vertical axis and the tangent to the envelope at said lower pole is approximately 92° to 100°.

19. A method of inflating a cylindrical space balloon envelope having a vertical axis and having upper and lower poles and containing a vertical axial tie means between said poles as defined in claim 17, further comprising the steps of:
   a. ceasing inflation when the angle $\alpha$ subtended between said vertical axis and the tangent to the lower pole is approximately 30° to 60°.

* * * * *